A. CHICOUSKY, Jr.
QUACK GRASS DESTROYER.
APPLICATION FILED JULY 6, 1918.
1,294,049.
Patented Feb. 11, 1919.
2 SHEETS—SHEET 1.
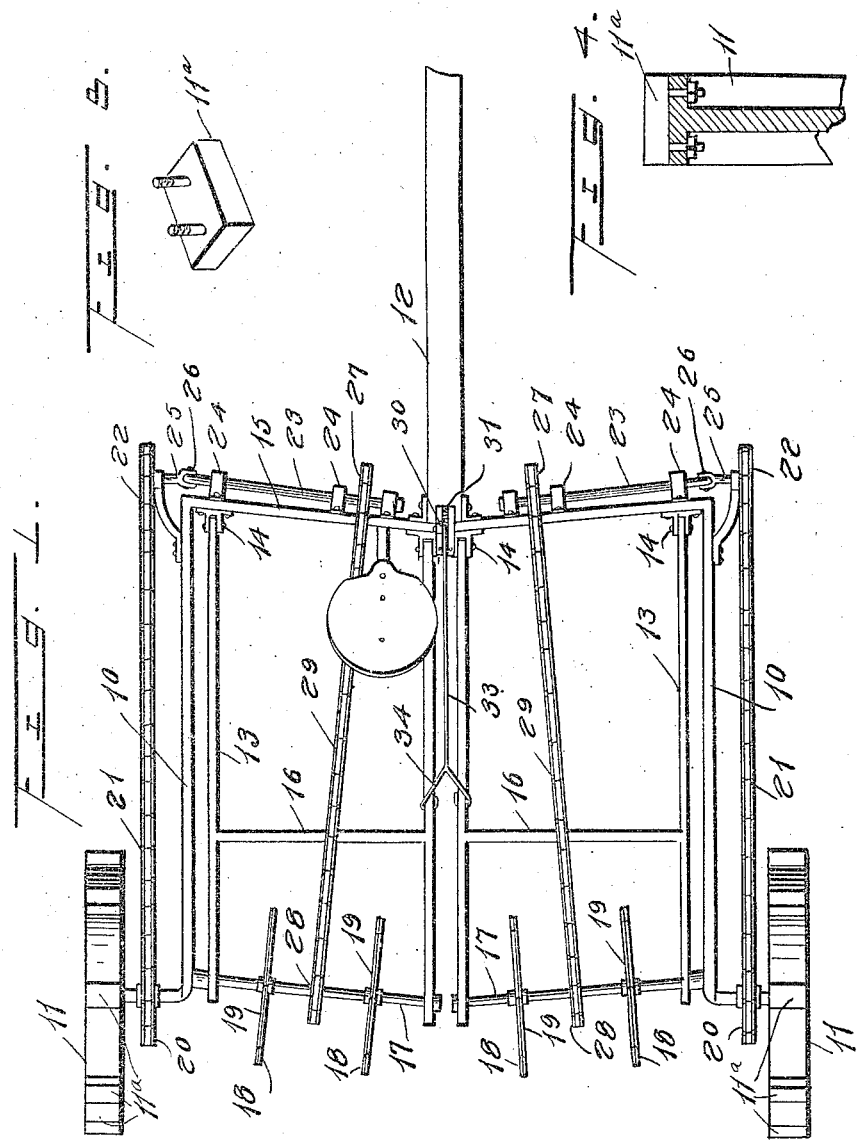
Inventor
A. Chicousky, Jr.

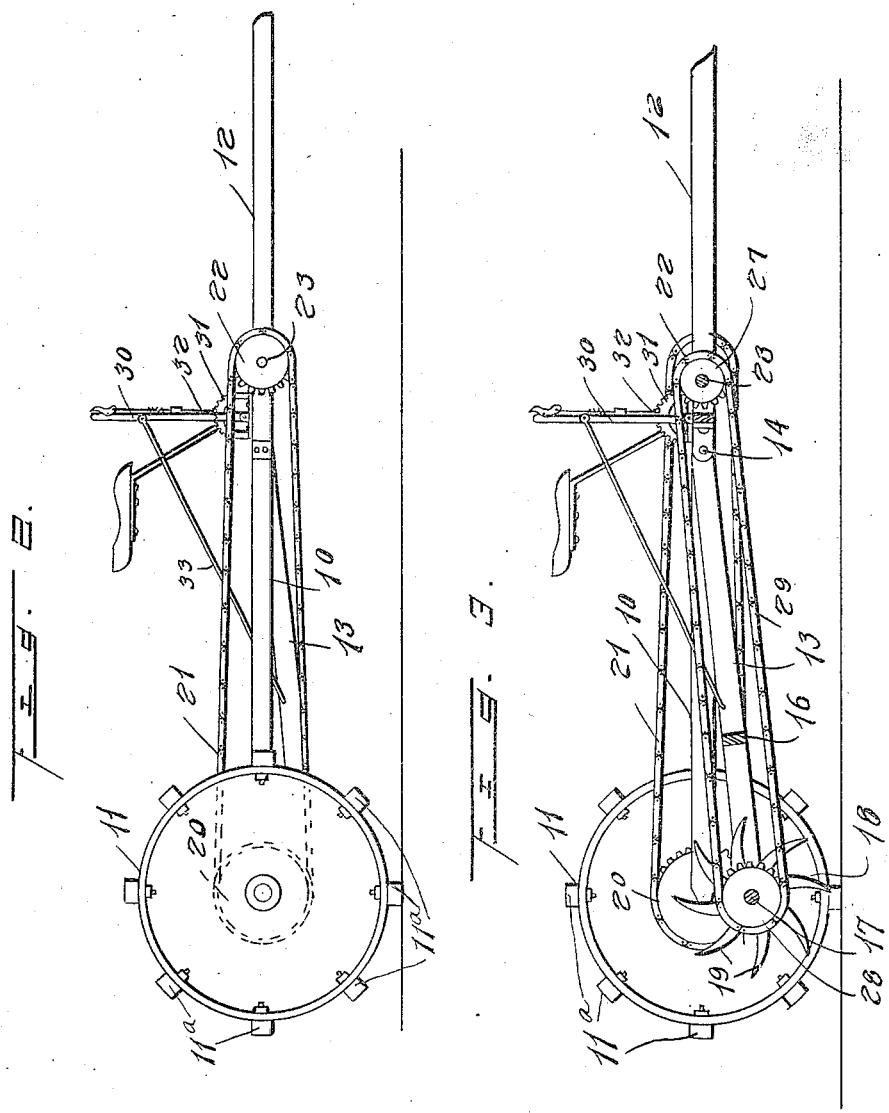

UNITED STATES PATENT OFFICE.

ADAM CHICOUSKY, JR., OF MARQUETTE, MICHIGAN.

QUACK-GRASS DESTROYER.

1,294,049.

Specification of Letters Patent.

Patented Feb. 11, 1919.

Application filed July 6, 1918. Serial No. 243,688.

*To all whom it may concern:*

Be it known that I, ADAM CHICOUSKY, Jr., a citizen of the United States, residing at Marquette, in the county of Marquette and State of Michigan, have invented certain new and useful Improvements in Quack-Grass Destroyers; and I do hereby declare the following to be a full, clear, and exact description of the invention, such as will enable others skilled in the art to which it appertains to make and use the same.

The object of the invention is to provide a simple and relatively inexpensive and efficient machine for removing and destroying quack grass sod by uprooting the same and rendering it harmless, and with this object in view the invention consists in a construction, combination and relation of parts hereinafter fully explained, it being understood that changes in form proportion and details may be resorted to within the scope of the appended claim, without departing from the spirit of the invention.

In the drawings:

Figure 1 is a plan view of a machine embodying the invention.

Fig. 2 is a side view of the same.

Fig. 3 is a longitudinal sectional view.

Fig. 4 is a detail perspective view of one of the gripping blocks of the ground wheels.

Fig. 5 is a fragmentary section through one of the ground wheels showing the gripping block applied.

Within a suitable supporting or main frame 10 upon which are mounted the traction ground wheels 11 and with which is connected a draft appliance such as a tongue 12 are mounted swinging frames 13 of which the side elements are pivotally mounted as at 14 upon the front transverse bar 15 of the main frame. The ground wheels 11 are preferably provided with gripping blocks 11ª which serve in the well known manner to prevent slipping of the ground wheels and insure positive drive thereof, these blocks being applied by nut and bolt means as shown in Fig. 4, or in any other suitable manner. The side arms or elements of the swinging frame may be connected by transverse braces 16 and at their rear ends they are provided with bearings for transverse shafts 17 which carry disks 18 provided with curved prongs 19, designed in the rotation of the disks to uproot the quack grass and other weeds and expose the same upon the surface of the ground so that they may be dried out and destroyed. The disks 18 are set at an angle to the longitudinal center or line of draft of the machine by disposing the shafts 17 on rearwardly convergent lines as shown clearly in Fig. 1, and by reason of this disposition of the disks, the tearing or uprooting action of their curved prongs is materially increased, it being understood of course that any desired number of disks may be employed upon each shaft, so that they may be disposed at a sufficiently short interval to completely cover the surface of the ground traversed.

Connected with the ground or traction wheels 11 are sprocket wheels 20 connected by chains 21 with sprocket wheels 22 on transverse counter-shafts 23 disposed at the front of the main supporting frame and mounted thereon by means of bearings 24. Said forward sprocket wheels 22 have their spindles 25 connected with the shafts 23 by means of knuckles 26 so that the angular disposition of the shaft members 23, preferably parallel with the shafts 17, will not interfere with the proper communication of motion from the ground wheels to the disks which serve to uproot the quack grass and other weeds. Connection between the outer shaft 23 and the disk shafts is effected by means of sprocket wheels 27 on the former and sprocket wheels 28 on the latter traversed by sprocket chains 29.

Also in order to provide for raising the sod uprooting disks from the ground when their operation is not needed, lifting devices may be employed such as hand lever 30 disposed in operative relation with a toothed segment 31 for engagement by a pawl 32, and a rod 33 engaged with a yoke 34 which is attached to the inner arms or members of the pivotal frames 13.

From the foregoing description and as indicated in the drawings, it will be obvious that the pronged uprooting disks disposed at an angle to the line of progress of the machine rotate in the same direction as the ground wheels from which they receive motion, and by proportioning the sprocket wheels properly, the said disks may be given a rate of rotation which is multiplied as compared with that of the ground wheels, to produce a violent and effective tearing action upon the sod or surface of the soil in which the quack grass or other weeds may be growing, and as above noted it is only necessary to place these disks at a sufficiently short interval to effectively remove the roots of such obstacles and dispose them upon the surface so that they may be dried out and killed by the heat of the sun.

Having described the invention, I claim:

A machine for uprooting quack grass having a main frame and ground wheels, swinging frames mounted within the main frame, peripherally pronged uprooting disks disposed at an angle to the line of progress of the machine and having their shafts mounted in said swinging frames, counter-shafts mounted upon the main frame parallel with the shafts of said disks, operating connections between said ground wheels and the counter-shafts including knuckles in the latter, chain driving connections between the counter-shafts and the shafts of said pronged disks, and means for adjusting the swinging frames to vary the depth of the engagement of said disks.

In testimony whereof I affix my signature in presence of two witnesses.

ADAM CHICOUSKY, Jr.

Witnesses:
JOHN WEILAND,
LOUIS FISSBENDER.

Copies of this patent may be obtained for five cents each, by addressing the "Commissioner of Patents, Washington, D. C."